(12) United States Patent
McMillen et al.

(10) Patent No.: US 7,140,680 B2
(45) Date of Patent: *Nov. 28, 2006

(54) FOLD DOWN SEAT LUMBAR SUPPORT APPARATUS AND METHOD

(75) Inventors: Robert J. McMillen, Tecumseh (CA); Robert Renato Colja, Windsor (CA); Lukic Zeljko, Windsor (CA)

(73) Assignee: L&P Property Management Company, South Gate, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/361,475

(22) Filed: Feb. 10, 2003

(65) Prior Publication Data

US 2004/0155501 A1 Aug. 12, 2004

Related U.S. Application Data

(63) Continuation-in-part of application No. 10/349,525, filed on Jan. 22, 2003, now Pat. No. 6,905,170.

(51) Int. Cl.
*A47C 4/025* (2006.01)

(52) U.S. Cl. .............................. 297/284.9; 297/284.4; 297/284.8; 297/284.1

(58) Field of Classification Search ............. 297/284.1, 297/284.2, 284.4, 284.8, 284.9
See application file for complete search history.

(56) References Cited

U.S. PATENT DOCUMENTS

| | | | |
|---|---|---|---|
| 1,182,854 A | 5/1916 | Poler | |
| 1,203,293 A | 10/1916 | Wilkinson | |
| 2,274,176 A | 2/1942 | Widman | |
| 2,756,809 A | 7/1956 | Endresen | 155/182 |
| 2,833,339 A | 5/1958 | Liljengren | |
| 2,843,195 A | 7/1958 | Barvaeus | 155/182 |
| 2,855,984 A | 10/1958 | Majorana et al. | |
| 2,942,651 A | 6/1960 | Binding | 155/18 |
| 3,121,585 A | 2/1964 | Krueger et al. | |
| 3,202,453 A | 8/1965 | Richards | |
| 3,241,879 A | 3/1966 | Castello et al. | |

(Continued)

FOREIGN PATENT DOCUMENTS

AT 401 497 9/1996

(Continued)

*Primary Examiner*—Laurie K. Cranmer
(74) *Attorney, Agent, or Firm*—Husch & Eppenberger, LLC; Grant D. Kang; Dennis J. M. Donahue, III

(57) ABSTRACT

A fold down seat back has an ergonomic support device in it. A traction cable is operatively engaged at one end with the lumbar support device to actuate it. The fold down seat back includes a rotating cable tension unit and a fixed torsion bar. The rotating member moves relative to the fixed member when said fold down seat back is folded down. The traction cable is comprised of a sleeve having a first end and a second end and a wire having a first end and a second end. The wire is disposed to slide axially through the sleeve. The first sleeve end is attached to the rotating cable tension unit. The wire end is attached to the fixed torsion bar. The wire end may be attached to the torsion rod with a pulley. These attachments of the sleeve end and the wire end cause the wire to be drawn axially through the sleeve when the seat back is folded up, extending a lumbar support, and cause the wire to be relaxed when the seat back is folded down, flattening the lumbar support. The ergonomic device may be a bolster, a wire array, an arching pressure surface or a scissors lumbar support.

31 Claims, 15 Drawing Sheets

U.S. PATENT DOCUMENTS

| | | | |
|---|---|---|---|
| 3,246,924 A | 4/1966 | Krueger et al. | |
| 3,271,076 A | 9/1966 | Smith | |
| 3,273,877 A | 9/1966 | Geller et al. | |
| 3,363,941 A | 1/1968 | Wierwille | |
| 3,378,299 A | 4/1968 | Sandor | 297/284 |
| 3,146,839 A | 12/1968 | Flint | |
| 3,490,084 A | 1/1970 | Schuster | 5/351 |
| 3,492,768 A | 2/1970 | Shuster | 52/98 |
| 3,550,953 A | 12/1970 | Neale | |
| 3,695,688 A | 10/1972 | Wize | |
| 3,724,144 A | 4/1973 | Schuster | 52/108 |
| 3,762,769 A | 10/1973 | Poschl | 297/284 |
| 3,927,911 A | 12/1975 | Rosquist | |
| 3,929,374 A * | 12/1975 | Hogan et al. | 297/61 |
| 3,938,858 A * | 2/1976 | Drabert et al. | 297/284.4 |
| 3,967,852 A | 7/1976 | Eiselt et al. | |
| 3,983,640 A | 10/1976 | Cardullo et al. | |
| 3,992,059 A | 11/1976 | Kloepfer | |
| 4,040,661 A * | 8/1977 | Hogan et al. | 297/284.4 |
| 4,105,245 A | 8/1978 | Simons et al. | |
| 4,136,577 A | 1/1979 | Borgersen | 74/479 |
| 4,153,293 A | 5/1979 | Sheldon | 297/284 |
| 4,155,592 A | 5/1979 | Tsuda et al. | |
| 4,156,544 A | 5/1979 | Swenson et al. | 297/284 |
| 4,182,533 A | 1/1980 | Arndt et al. | 297/284 |
| 4,190,286 A | 2/1980 | Bentley | |
| 4,295,681 A | 10/1981 | Gregory | 297/284 |
| 4,313,637 A | 2/1982 | Barley | 297/284 |
| 4,316,631 A | 2/1982 | Lenz et al. | 297/284 |
| 4,354,709 A | 10/1982 | Schuster | 297/284 |
| 4,368,916 A | 1/1983 | Blasin | |
| 4,390,210 A | 6/1983 | Wisniewski et al. | 297/452 |
| 4,428,611 A | 1/1984 | Widmer | |
| 4,449,751 A | 5/1984 | Murphy et al. | 297/284 |
| 4,452,485 A | 6/1984 | Schuster | 297/284 |
| 4,465,317 A | 8/1984 | Schwarz | 297/284 |
| 4,519,646 A | 5/1985 | Leitermann et al. | |
| 4,541,670 A | 9/1985 | Morgenstern et al. | 297/284 |
| 4,555,140 A | 11/1985 | Nemoto | 297/452 |
| 4,556,251 A | 12/1985 | Takagi | 297/284 |
| 4,564,235 A | 1/1986 | Hatsutta et al. | 297/284 |
| 4,565,406 A | 1/1986 | Suzuki | 297/284 |
| 4,576,410 A | 3/1986 | Hattori | 297/284 |
| 4,601,514 A | 7/1986 | Meiller | 297/284 |
| 4,602,819 A | 7/1986 | Morel | 297/460 |
| 4,616,874 A | 10/1986 | Pietsch et al. | |
| 4,619,481 A | 10/1986 | Grudzinskas | |
| 4,627,661 A | 12/1986 | Ronnhult et al. | 297/284 |
| 4,630,865 A | 12/1986 | Ahs | 297/284 |
| 4,632,454 A | 12/1986 | Naert | 297/284 |
| 4,634,083 A | 1/1987 | McKinnon | |
| 4,655,505 A | 4/1987 | Kashiwamura et al. | |
| 4,676,550 A | 6/1987 | Neve De Mevergnies | 297/353 |
| 4,679,848 A | 7/1987 | Spierings | 297/284 |
| 4,699,418 A | 10/1987 | Plavetich | |
| 4,707,207 A | 11/1987 | Horvath et al. | |
| 4,711,490 A | 12/1987 | Brand | |
| 4,730,871 A | 3/1988 | Sheldon | 297/230 |
| 4,768,830 A | 9/1988 | Musselwhite | |
| 4,826,249 A | 5/1989 | Bradbury | |
| 4,833,614 A | 5/1989 | Saitoh et al. | |
| 4,880,271 A | 11/1989 | Graves | 257/284 |
| 4,909,568 A | 3/1990 | Dal Monte | 292/284 |
| 4,915,448 A | 4/1990 | Morgenstern | 297/284 |
| 4,950,032 A | 8/1990 | Nagasaka | 297/284 |
| 4,957,102 A | 9/1990 | Tan et al. | 128/68 |
| 4,968,093 A | 11/1990 | Dal Monte | 297/284 |
| 4,976,104 A | 12/1990 | Morris et al. | |
| 5,005,904 A | 4/1991 | Clemens et al. | 297/284 |
| 5,022,709 A | 6/1991 | Marchino | 297/452 |
| 5,026,116 A | 6/1991 | Dal Monte | 297/284 |
| 5,050,930 A | 9/1991 | Schuster et al. | 257/284 |
| 5,076,643 A | 12/1991 | Colasanti et al. | 297/284 |
| 5,082,326 A | 1/1992 | Sekido et al. | |
| 5,088,790 A | 2/1992 | Wainwright et al. | 297/284 |
| 5,092,654 A | 3/1992 | Inaba et al. | |
| 5,120,111 A | 6/1992 | Cook | |
| 5,137,329 A | 8/1992 | Neale | 297/284 |
| 5,174,526 A | 12/1992 | Kanigowski | 244/122 |
| 5,195,795 A | 3/1993 | Cannera et al. | |
| 5,197,780 A | 3/1993 | Coughlin | 297/284.7 |
| 5,215,350 A | 6/1993 | Kato | 297/284.4 |
| 5,217,278 A | 6/1993 | Harrison et al. | 297/284.7 |
| 5,269,581 A | 12/1993 | Odagaki et al. | |
| 5,286,087 A | 2/1994 | Elton | 297/284.7 |
| 5,292,175 A | 3/1994 | Artz | |
| 5,292,176 A | 3/1994 | Artz | |
| 5,299,851 A | 4/1994 | Lin | 297/284.5 |
| 5,316,371 A | 5/1994 | Bishai | |
| 5,335,965 A | 8/1994 | Sessini | 297/284.4 |
| 5,368,355 A | 11/1994 | Hayden et al. | |
| 5,385,389 A | 1/1995 | Bishai | |
| 5,385,531 A | 1/1995 | Jover | 601/99 |
| 5,397,164 A | 3/1995 | Schuster | 297/284.1 |
| 5,397,167 A | 3/1995 | Fourrey et al. | |
| 5,423,593 A | 6/1995 | Nagashima | 297/284.5 |
| 5,449,219 A | 9/1995 | Hay et al. | 297/284.4 |
| 5,452,868 A | 9/1995 | Kanigowski | 244/122 R |
| 5,472,261 A * | 12/1995 | Oplenskdal et al. | 297/342 |
| 5,474,358 A | 12/1995 | Maeyaert | 297/284.7 |
| 5,482,346 A | 1/1996 | Lesourd | |
| 5,498,063 A | 3/1996 | Schuster et al. | 297/284.1 |
| 5,518,294 A | 5/1996 | Ligon, Sr. et al. | 297/284.4 |
| 5,529,377 A | 6/1996 | Miller | |
| 5,553,917 A | 9/1996 | Adat et al. | 297/230.14 |
| 5,562,324 A | 10/1996 | Massara et al. | 297/284.6 |
| 5,567,010 A | 10/1996 | Sparks | 297/284.4 |
| 5,567,011 A | 10/1996 | Sessini | 297/284.4 |
| 5,570,931 A | 11/1996 | Kargilis et al. | |
| 5,588,703 A | 12/1996 | Itou | 297/284.4 |
| 5,588,707 A | 12/1996 | Bolsworth et al. | |
| 5,609,394 A | 3/1997 | Ligon, Sr. et al. | 297/284.4 |
| 5,626,390 A | 5/1997 | Schuster et al. | 297/284.1 |
| 5,638,722 A | 6/1997 | Klingler | 74/502.4 |
| 5,651,583 A | 7/1997 | Klingler et al. | 297/284.4 |
| 5,651,584 A | 7/1997 | Chenot et al. | 297/284.4 |
| 5,660,438 A | 8/1997 | Tedesco | |
| 5,681,079 A * | 10/1997 | Robinson | 297/61 |
| 5,704,687 A | 1/1998 | Klingler | 297/284.4 |
| 5,718,476 A | 2/1998 | De Pascal et al. | 297/284.4 |
| 5,730,495 A | 3/1998 | Tuman, II | |
| 5,758,925 A | 6/1998 | Schrewe et al. | 297/284.6 |
| 5,762,397 A | 6/1998 | Venuto et al. | 297/284.4 |
| 5,769,491 A | 6/1998 | Schwarzbich | 297/284.4 |
| 5,772,281 A | 6/1998 | Massara | 297/284.4 |
| 5,775,773 A | 7/1998 | Schuster et al. | 297/284.1 |
| 5,791,733 A | 8/1998 | Van Hekken et al. | 297/284.4 |
| 5,816,653 A | 10/1998 | Benson | 297/284.4 |
| 5,823,620 A | 10/1998 | Le Caz | 297/284.4 |
| 5,857,743 A | 1/1999 | Ligon, Sr. et al. | 297/284.9 |
| 5,868,466 A | 2/1999 | Massara | 297/284.6 |
| 5,884,968 A | 3/1999 | Massara | 297/216.12 |
| 5,897,168 A | 4/1999 | Bartelt et al. | 297/452.18 |
| 5,911,477 A | 6/1999 | Mundell et al. | 297/284.4 |
| 5,913,569 A | 6/1999 | Klingler | 297/284.4 |
| 5,934,752 A | 8/1999 | Klingler | 297/284.4 |
| 5,941,602 A | 8/1999 | Sturt et al. | |
| 5,967,608 A | 10/1999 | Van Sickle | |
| 5,975,632 A | 11/1999 | Ginat | 297/284.4 |
| 5,984,407 A | 11/1999 | Ligon, Sr. et al. | 297/284.4 |
| 5,988,745 A | 11/1999 | Deceuninck | 297/284.4 |
| 6,003,941 A | 12/1999 | Schuster, Sr. et al. | 297/284.1 |
| 6,007,151 A | 12/1999 | Benson | 297/284.4 |
| 6,030,041 A | 2/2000 | Hsiao | 297/284.4 |

| | | | | | |
|---|---|---|---|---|---|
| 6,036,265 A | 3/2000 | Cosentino ............ 297/284.4 | DE | 206 4419 | 7/1972 |
| 6,045,185 A | 4/2000 | Ligon, Sr. et al. ...... 297/284.4 | DE | 29 47 472 | 8/1980 |
| 6,050,641 A | 4/2000 | Benson ............... 297/284.4 | DE | 42 20 995 A1 | 1/1994 |
| 6,079,783 A | 6/2000 | Schuster, Sr. et al. ... 297/284.4 | DE | 19750116 A1 | 5/1999 |
| 6,092,871 A | 7/2000 | Beaulieu ............. 297/284.4 | DE | 10005215 C1 | 9/2001 |
| 6,152,531 A | 11/2000 | Deceuninck .......... 297/284.4 | EP | 0 006 840 B1 | 2/1982 |
| 6,152,532 A | 11/2000 | Cosentino ............ 297/284.4 | EP | 0 169 293 B1 | 10/1988 |
| 6,158,300 A | 12/2000 | Klingler ................. 74/526 | EP | 0 322 535 A1 | 7/1989 |
| 6,174,017 B1 | 1/2001 | Salani et al. | EP | 0 485 483 B1 | 1/1994 |
| 6,199,951 B1 | 3/2001 | Zeile et al. | EP | 0 434 660 B1 | 5/1995 |
| 6,227,617 B1 | 5/2001 | Von Möller ........... 297/284.4 | EP | 0 540 481 B1 | 12/1995 |
| 6,227,618 B1 | 5/2001 | Ligon, Sr. et al. ...... 297/284.4 | EP | 0 662 795 B1 | 12/1996 |
| 6,254,186 B1 | 7/2001 | Falzon ................... 297/284 | EP | 0 702 522 B1 | 3/1997 |
| 6,254,187 B1 | 7/2001 | Schuster, Sr. et al. ... 297/284.1 | EP | 0 696 251 B1 | 7/1997 |
| 6,270,158 B1 | 8/2001 | Hong ................... 297/284.4 | EP | 0 746 219 B1 | 11/1998 |
| 6,296,308 B1 | 10/2001 | Cosentino et al. ...... 297/284.4 | EP | 0 797 399 B1 | 11/1998 |
| 6,334,651 B1 | 1/2002 | Duan et al. ............ 297/284.4 | EP | 0 698 360 B1 | 3/2000 |
| 6,371,558 B1 | 4/2002 | Couasnon | FR | 2 596 334 | 10/1987 |
| 6,375,255 B1 | 4/2002 | Maruta et al. | GB | 1 423 617 | 2/1976 |
| 6,554,360 B1 * | 4/2003 | Wilke et al. ............. 297/342 | GB | 2 013 487 | 2/1978 |
| 6,736,456 B1 | 5/2004 | Sturt | RU | 587924 | 2/1978 |
| 2002/0041121 A1 | 4/2002 | Takata | WO | WO/00/00064 | 1/2000 |
| 2002/0125753 A1 | 9/2002 | Kammerer | WO | WO 2003/022626 A1 | 3/2003 |
| 2002/0185904 A1 | 12/2002 | Carlson et al. | WO | WO 2004/043207 A2 | 5/2004 |
| 2003/0071501 A1 | 4/2003 | Pinho et al. ........... 297/284.4 | WO | WO 2004/043730 A2 | 5/2004 |

FOREIGN PATENT DOCUMENTS

| | | |
|---|---|---|
| DE | 2040794 | 7/1971 |

* cited by examiner ically in U.S. application Ser. No. 10/315,320, all of which are
FOLD DOWN SEAT LUMBAR SUPPORT APPARATUS AND METHOD

CROSS-REFERENCE TO RELATED APPLICATIONS

This application is a continuation in part of Ser. No. 10/349,525 claiming priority to the application for Fold Down Seat Lumbar Support Apparatus and Method filed on Jan. 22, 2003 now U.S. Pat. No. 6,905,170.

STATEMENT REGARDING FEDERALLY SPONSORED RESEARCH OR DEVELOPMENT

Not Applicable.

BACKGROUND OF THE INVENTION

1. Field of the Invention

This invention is in the field of lumbar supports for automobiles.

2. Related Art

Lumbar supports for automobile seats are a known and popular ergonomic option.

Whether lumbar supports are static or variable, their effect depends upon the creation of depth in the portion of the seat positioned to correspond to the passenger's lumbar spine.

Another popular feature in vehicles having cargo space such as sport utility vehicles, station wagons and the like, is fold down rear seats. Folding these seats down increases the cargo space. For that purpose, it is advantageous that the seat backs for the fold down rear seats be as thin as possible in their down position. Any reduction in the depth of the seat back when it is folded down increases the amount of available cargo space above it.

Hence, there is a need in the industry for a fold down rear seat back that has depth in the lumbar area when in its up position and is as thin as possible when in its down position.

SUMMARY OF THE INVENTION

It is in view of the above problems that the present invention was developed. The present invention is a fold down rear seat back for a motor vehicle that has depth in the lumbar area when in its up position, and automatically reduces that depth when folded down into its folded position.

A lumbar support device is in a fold down seat back. A traction cable is operatively engaged at one end with the lumbar support device. The fold down seat back includes a rotating member and a fixed member. The fixed member may be a torsion bar. The rotating member may be a mount, a cable tension unit, or other device operatively engaged with the other end of the traction cable and with the fixed member. The rotating member moves relative to the fixed member when said fold down seat back is folded down. The traction cable is comprised of a sleeve having a first end and a second end and a wire having a first end and a second end. The wire is disposed to slide axially through the sleeve.

The first sleeve end is attached to one of the fixed member or the rotating member; the first wire end is attached to the other member. The wire end may be attached to the torsion rod with a pulley. These attachments of the sleeve end and the wire end cause the wire to be drawn axially through the sleeve when the seat back is folded up, extending a lumbar support, and cause the wire to be relaxed when the seat back is folded down, flattening the lumbar support when the seat back is down.

Further features and advantages of the present invention, as well as the structure and operation of various embodiments of the present invention, are described in detail below with reference to the accompanying drawings.

BRIEF DESCRIPTION OF THE DRAWINGS

The accompanying drawings, which are incorporated in and form a part of the specification, illustrate the embodiments of the present invention and together with the description, serve to explain the principles of the invention. In the drawings.

DETAILED DESCRIPTION OF THE PREFERRED EMBODIMENTS

Figure 1:
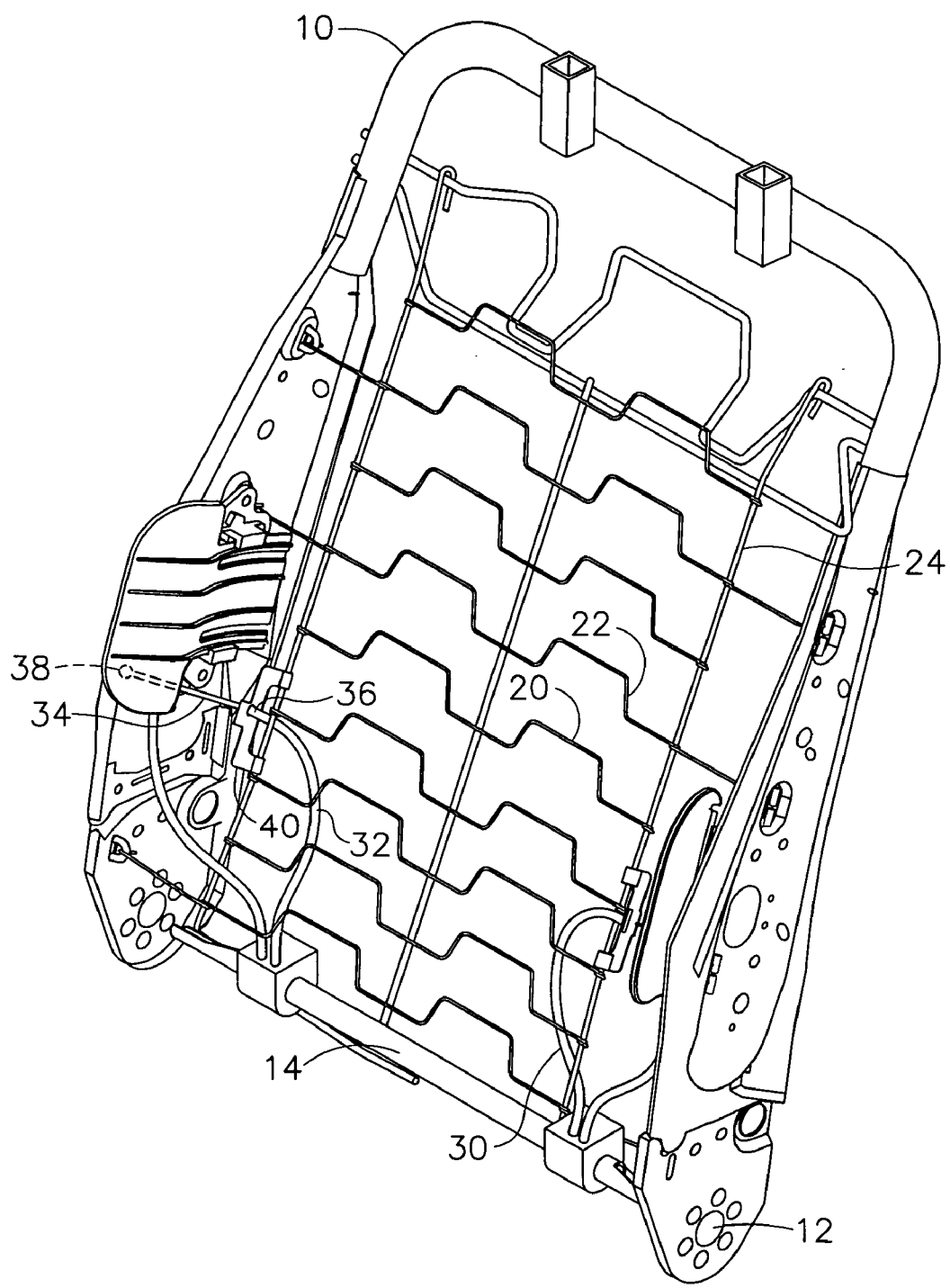
FIG. 1 is an isometric view of the automatic lumbar support as installed in a seat frame.
Figure 2:
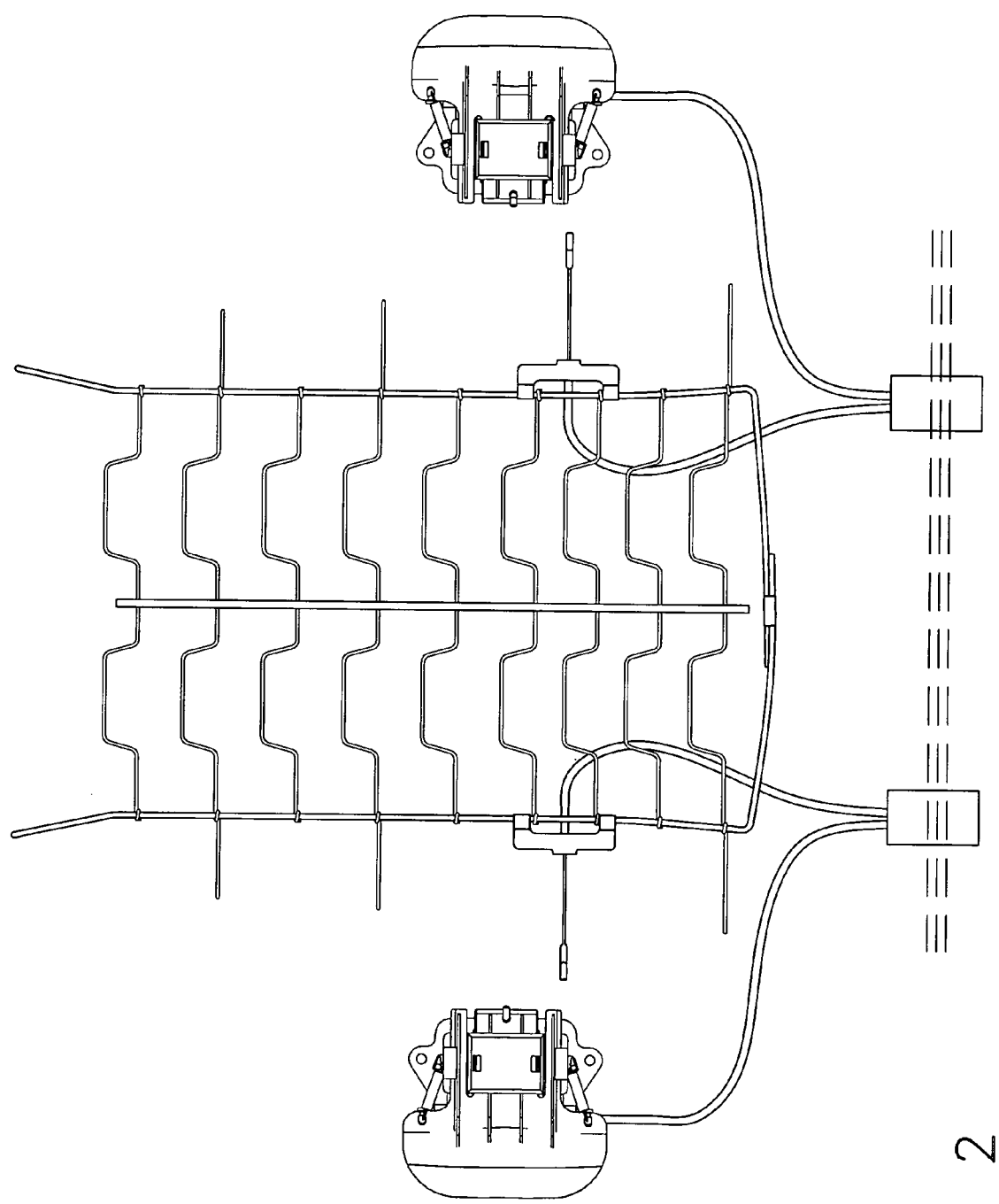
FIG. 2 is a schematic front view of the automatic lumbar support.

Referring to the accompanying drawings in which like reference numbers indicate like elements, FIG. 1 is an isometric view of the automatic lumbar support for a fold down seat back of the present invention. Seat back frame 10 is hingedly connected to a seat bottom frame (not shown) at connection 12. Although other connections between seat backs and seat bottoms are possible, it is common for a hinge connection such as that depicted to include a torsion bar 14. It is also common for a torsion bar 14 to be fixed such that it remains stationary at all positions of the seat back, and does not move when the seat back moves. Lumbar support 20 is mounted on seat frame 10.

It is appreciated by those in the art that many variable types of lumbar supports are known including many lumbar supports that are actuated by traction cables. Such traction cable actuated lumbar supports include, for example, arching pressure surfaces, such as are disclosed in U.S. Pat. Nos. 5,397,164 and 5,913,569, concave tensionable straps, such as disclosed in U.S. application Ser. No. 10/154,636, push paddles, such as are disclosed in U.S. application Ser. No. 09/798,657, and scissors type supports, such as are disclosed in U.S. application Ser. No. 10/315,320, all of which are incorporated by reference herein. Because of all of the referenced lumbar supports share the common feature of being actuated by traction that is applied with a traction cable, actuation of all these lumbar supports according to the automatic traction cable actuation described herein is considered to be within the scope of the present invention.

In the depicted embodiment, lumbar support 20 is an array of flexible wires including horizontal wires 22 and vertical wires 24. The depicted lumbar support wire array 20 is biased toward a substantially flat position. However, its flexibility allows it to be drawn into an arched or convex position having depth. This arched, convex position is achieved by the application of traction with traction cables.

Traction cables are known in the industry. They are sometimes called "Bowden cables." They include a sleeve or conduit with a cable or wire disposed within the sleeve and capable of sliding axially through it. As installed for use, an actuator at one end of the cable holds the sleeve end stationary while pulling the wire end out of the cable and away from the sleeve end. This achieves a corresponding traction or draw on the opposite end of the wire. The opposite end of the sleeve and wire are both connected to a lumbar support, or to a lumbar support combined with a connection to the seat frame. These connections are designed to move the lumbar support in to and out of arched, convex or otherwise lumbar supporting positions in response to the tractive force applied to the first end of the traction cable.

Figure 3:
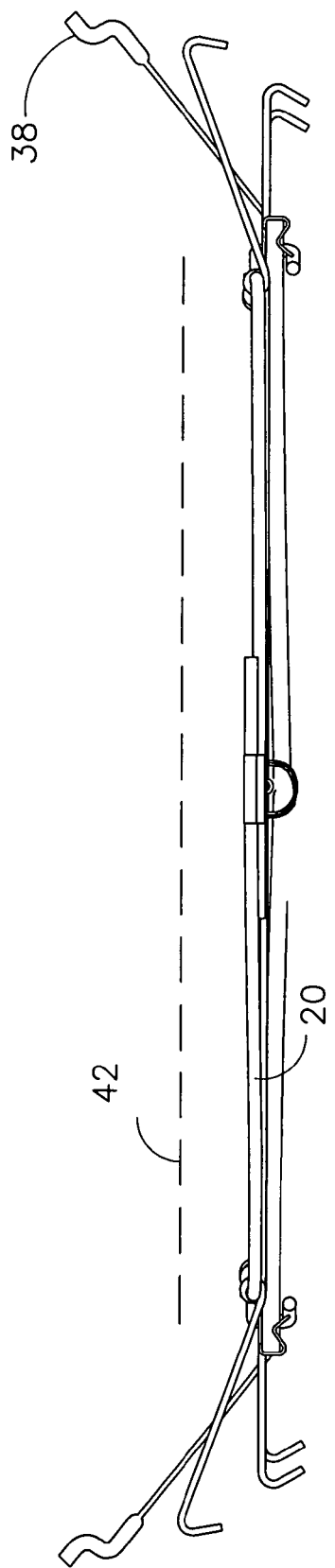
FIG. 3 is a top view of the automatic lumbar support.
Figure 4:
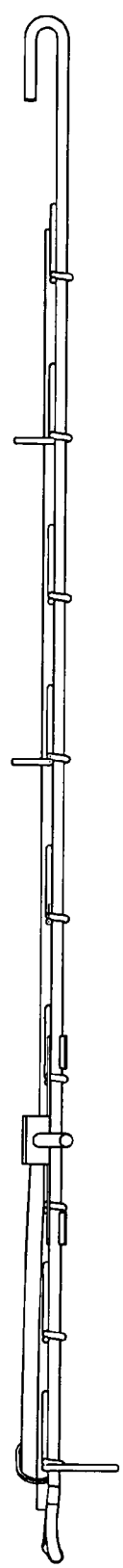
FIG. 4 is a side view of the automatic lumbar support.

In the depicted embodiment, tractive force is used to actuate the lumbar support via traction cables. Traction cable 30 is comprised of a sleeve (or "conduit") 32 and a wire 34 sliding through the sleeve. The sleeve has an end 36 which is fixedly attached to the lumbar support at bracket 40. Wire 34 extends beyond bracket 40. Wire 34 has a hook 38 at its end by means of which the wire end 38 is attached to a hole or a notch in seat frame 10 that is pre-configured to receive wire end hook 38. In the depicted embodiment, this hole or notch to which the wire end 38 is affixed is positioned forward of the bracket 40 and lumbar support 20. As is best seen in FIG. 3, this forward positioning of the wire ends 38 creates a depth of space into which lumbar support 20 may be drawn when traction is applied to the traction cable. Schematic line 42 indicates the greatest extent of lumbar support depth achievable by the depicted embodiment. The difference between schematic line 42 in FIG. 3 and the flat position of lumbar support 20 depicted in FIG. 3 represents both the degree of lumbar support that will be automatically actuated by the apparatus of the present invention, and also represents the amount of space that will be saved upon automatic flattening of the lumbar support when the seat back is folded down into its flat position.

As indicated above, vertical wires 24 and horizontal wires 22 are flexible. Of course seat frame 10 is inflexible. Accordingly, when traction is applied to traction cable 30 wire end 38 will not be able to move. Accordingly sleeve end 36 will move towards the point at which wire end 38 is attached to frame 10. That is, it will move forward. Through bracket 40, this will pull vertical wire 24 forward as well. In the depicted embodiment, this happens simultaneously on both lateral vertical wires. As is evident from FIG. 1, the attachment of brackets 40 and wire ends 38 is located at a position corresponding to the lumbar spine of the seat occupant. Accordingly a band of support will be created corresponding to the level of brackets 40 in the lumbar area. Wire array 20 is also supported at an upper end at mounts 44 and laterally at mounts 46. These mounts are also flexible, but not being at a level corresponding to the brackets 40, are not drawn forward into a lumbar supporting position. In an alternative embodiment, the entire wire array 20 may be replaced by an array having more rigid wires. For example vertical wires 24 could be completely rigid and horizontal wires 22 more stiff. In such a case, traction on the traction cables would draw the entire array forward creating a different sensation for a seat occupant which may be more desirable under some circumstances.

Traction is applied at cable tension unit 50. In the depicted embodiment, cable tension unit 50 rotates with the seat frame. Horizontal torsion rod 14 remains stationary, and does not rotate. In alternative embodiments also considered to be within the scope of the present invention, the torsion rod may turn with the seat back while the cable tension unit may remain stationary. Relative motion of the tension unit and torsion rod actuate the traction cable as follows. Cable tension unit 50 will have a hole or slot or channel narrowly dimensioned to allow passage therethrough of the traction cable wire 34, but too narrow to allow passage of the traction cable sleeve 32. Within the cable tension unit 50 traction cable wire 34 is attached to torsion rod 14. This attachment may be by any of a wide variety of known means of mechanical attachment, including without limitation, pulleys, levers and the like. When the seat back is folded upwards into its up position, the tension unit and the cable sleeve end 52 mounts on it rotate away from the attachment of the traction cable 34 to the torsion rod 14. The relative motion of cable tension unit 50 and torsion rod 14 will apply traction to draw the traction cable wire 34 out of and through the traction cable sleeve 32. As explained above, this traction at the first end of the traction cable will engage and actuate the lumbar support 20 at the other end of the traction cable, causing it to be drawn by traction into its lumbar supporting position.

Also depicted are bolsters 60. Bolsters are paddles deployed on the sides of the seat for lateral support of the passenger. They are also actuated by traction in a known manner. Like the lumbar support, bolsters 60 have a non supporting flat position and a supporting extended position. The extended position has a greater depth, front to back, then the retracted or flat position. Actuation of the bolsters to move them into their extended position is achieved by connecting the traction cable 30 to the cable tension unit in the same manner as described above for actuation of the lumbar support 20.

The converse operation is folding down the seat back. Moving the seat back down will again move the cable tension unit 50 and the torsion rod 14 relative to each other. The cable tension unit is deployed such that this motion of the seat back downwards will move the cable sleeve end 52 and the attachment of the traction cable wire 34 closer to one another. This relaxes tension on the first end of the traction cable, which in turn reduces the distance between the second traction cable wire end 38 and a traction cable sleeve second end 36. Accordingly, this relaxation of traction on the traction cable allows the lumbar support 20 and bolsters 60 to return to their untensioned, flat position. This return to the flat position is aided by the inherent spring or bias of the lumbar support wires 22 and 24 towards a flat position. It is also aided by the weight of the seat, weight of the cargo and force of the user pushing down on the back of the seat back.

Figure 5:
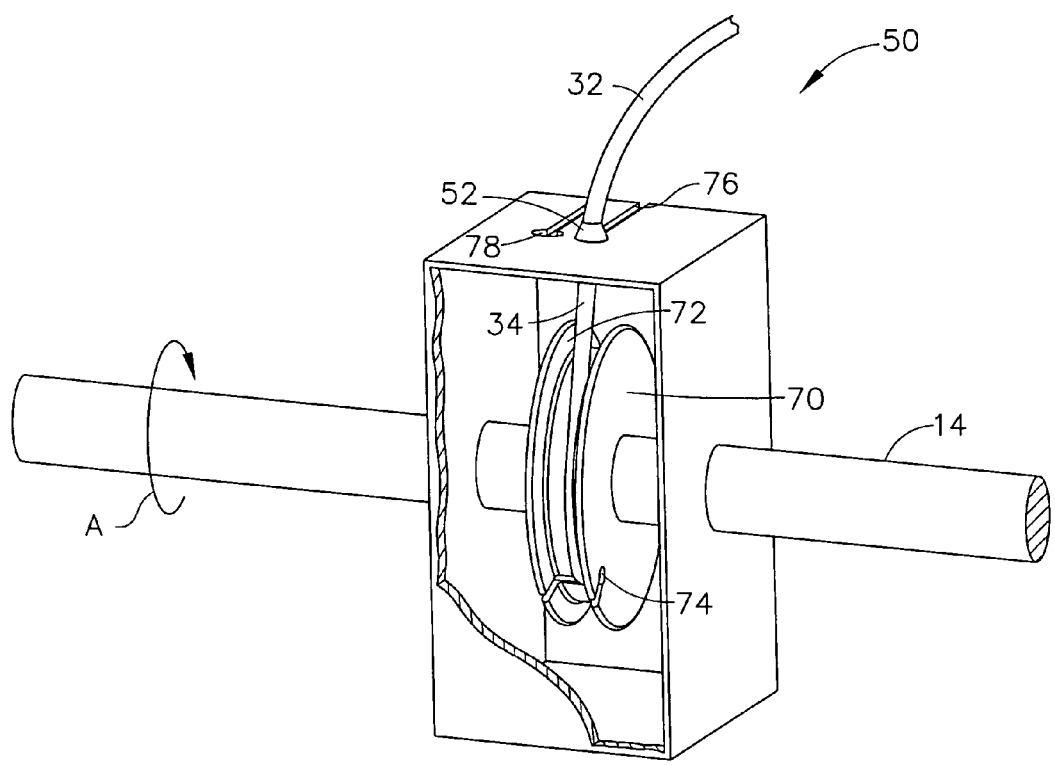
FIG. 5 is a cutaway detail of the cable tension unit.

FIG. 5 is a cutaway detail of the cable tension unit 50. The cable tension unit is fixedly attached to seat back frame in the depicted embodiment (not shown). Again, the torsion rod 14 could be fixedly attached to the seat back with the cable tension unit being fixedly attached to the seat bottom, as an alternative design. The present invention may be actuated by either component being attached to the seat back and the other component fixed to the bottom or otherwise fixed to the car frame, so long as the cable tension unit and torsion rod rotate relative to one another.

Pulley 70 is attached to torsion rod 14 inside of the cable tension unit 50. Pulley 70 is fixedly attached to the torsion rod 14 so that it does not move relative to the torsion rod 14. Pulley 70 is designed to pick up and release traction cable wire 34. Accordingly, pulley 70 has a circumferential channel 72 into which traction cable wire 34 may be taken up. Pulley 70 also has a seat 74 into which a bullet at the end of tension cable wire 34 may be inserted upon assembly. In operation, wire bullet seat 74 will hold the wire end in place as tension is applied. A slot 76 is fabricated into a wall of cable tension unit 50. This slot is used in assembly to lead the traction cable wire 34 through the cable tension unit to where it can be seated on pulley 70. Slot 76 also includes a key hole or a widening which forms another seat 78 for receiving the traction cable sleeve end 52. Hence, keyhole seat 78 is wide enough to allow passage of the traction cable wire 34 therethrough, but not passage of the traction cable sleeve 32.

In operation, when the seat back frame is rotated up, cable tension unit 50 will also rotate up or in the direction indicated by arrow A in FIG. 5. In so doing, traction cable sleeve seat 78 and the traction cable sleeve end 52 seated within it will be moved away from where the traction cable wire 34 is anchored to the stationary pulley at 74. This will of course have the effect of drawing the traction cable wire 34 through the traction cable sleeve 32, and consequently applying traction to it. This traction will effect actuation of the lumbar support and, optionally, bolsters at the other end of the traction cable. Accordingly, when the seat back is up, the traction cable is tensioned and the lumbar support is out. When the seat back is folded down, or opposite to arrow A in FIG. 5, cable tension unit 50 is rotated in a direction that will move the traction cable sleeve end 52 closer to the traction cable wire end anchor 74, allowing the tension on the wire to be reduced and allowing the wire to slide back into the sleeve 32. Accordingly, released tension on the other end the traction cable will allow the lumbar support, and optionally bolsters, to flatten, thereby reducing the thickness of the seat back in its folded down position, increasing cargo space.

It is considered to be within the scope of the present invention that various configurations of cable tension units may be used. For example, a traction cable sleeve mount seated in a portion of a seat back frame combined with a traction cable wire end bullet seat located in the frame of the seat bottom such that the sleeve end and wire end are separated when the seat is folded up. It is also contemplated that to be within the scope of the present invention that the automatic actuation upon folding of the present invention be combined with any of the variable lumbar support technologies incorporated by reference herein.

ALTERNATIVE EMBODIMENTS

A first alternative embodiment incorporates pivoting side bolsters 160. Rigid seat frame 110 has lumbar support wire array 120 mounted on it at mounts 144, which are the ends of vertical wires 124. Vertical wires 124 may be rigid or semi-rigid.

Torsion rod 114 is mounted to and engaged with the overall seat frame in a manner substantially equivalent to that depicted in FIG. 1 and described in the accompanying text. Substantially equivalent actuator 150 is engaged with torsion rod 114 in order to actuate Bowden cable 130, also in the manner previously described.

Bolsters 160 are mounted with pivoting clamps 170 to vertical rods 124. Each bolster 160 is comprised of a rigid wire having a medial aspect 172 and 174 and a lateral aspects 176, 178. The lateral aspects 176 and 178 comprise pressure surfaces proximate to a seat cushion and, therethrough, the seat occupant and that will support the seat occupants' weight. These lateral portions 176 and 178 may be augmented by supporting wires 180.

Attached to each medial aspect 172 and 174 is a bracket 140. Bowden cable sleeve 132 is attached to a first bracket at 136. Bowden cable wire 134 is attached by a similar mount at opposing bracket 140. Brackets 140 are disposed in an opposing fashion around a vertical midline. Accordingly, when traction is applied to the Bowden traction cable 130, the wire end being drawn into the sleeve end will cause the brackets 140 to approach one another. Traction is actuated by actuator 150 in the manner described above.

Figure 6:
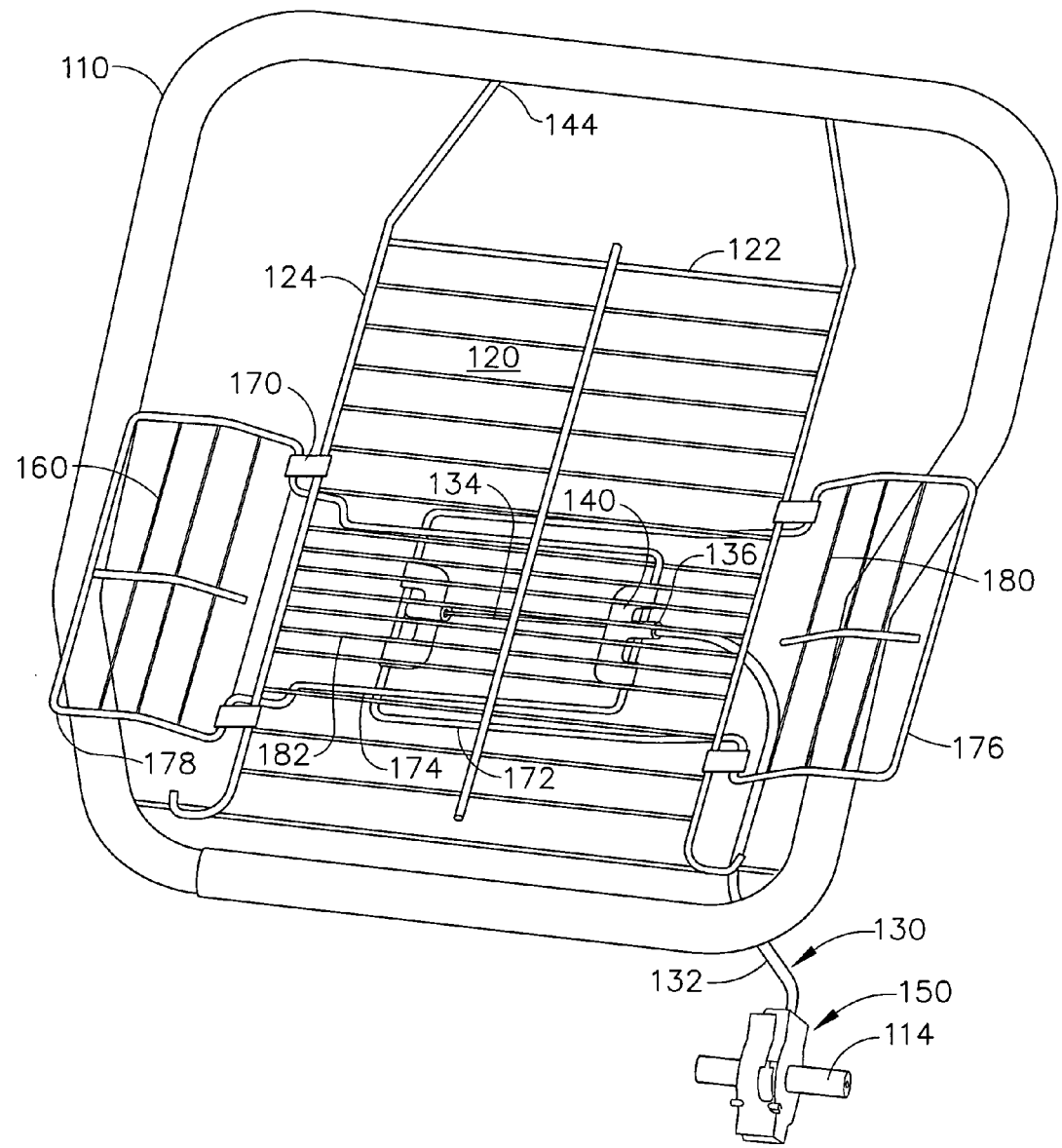
FIG. 6 is a perspective view of an alternative embodiment.
Figure 7:
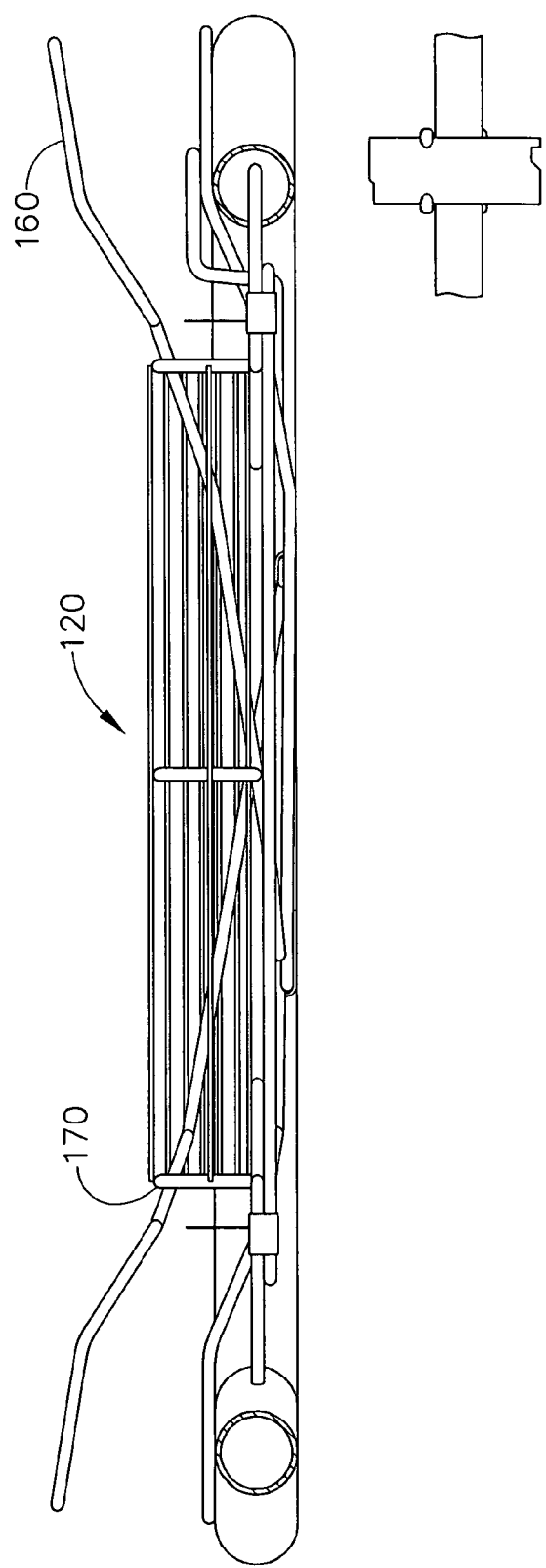
FIG. 7 is a bottom view of an alternative embodiment.

Upon application of traction, brackets 140 will be constrained from approaching one another on the same plane because of the restraint of pivoting clamps 170 holding bolster wires 160 from inward movement by their attachment to rigid or semi-rigid vertical wires 124. Pivoting clamps 170 are the only attachment of bolsters 160 to the lumbar support 120. Accordingly, continuing traction applied to brackets 140 will cause the bolster wires 160 to rotate around pivoting clamps 170. The medial aspects 172 and 174 will be drawn out of the plane they occupy in their rest position, and in a direction that is away from the viewer and out of the plane of the page in FIG. 6, and towards the bottom of FIG. 7. This perpendicular or transverse movement of the medial aspects 172 and 174 will, in conjunction with the rotating or pivoting action of brackets 170, cause the lateral aspects 176 and 178 of bolsters 160 to proceed towards the seat occupant, that is out of plane of the page in FIG. 6 and towards the viewer.

As a design alternative, the lateral aspects 176 and 178, or the support wires 180 in them, may have attached to them supplemental lateral wires 182.

Figure 8:
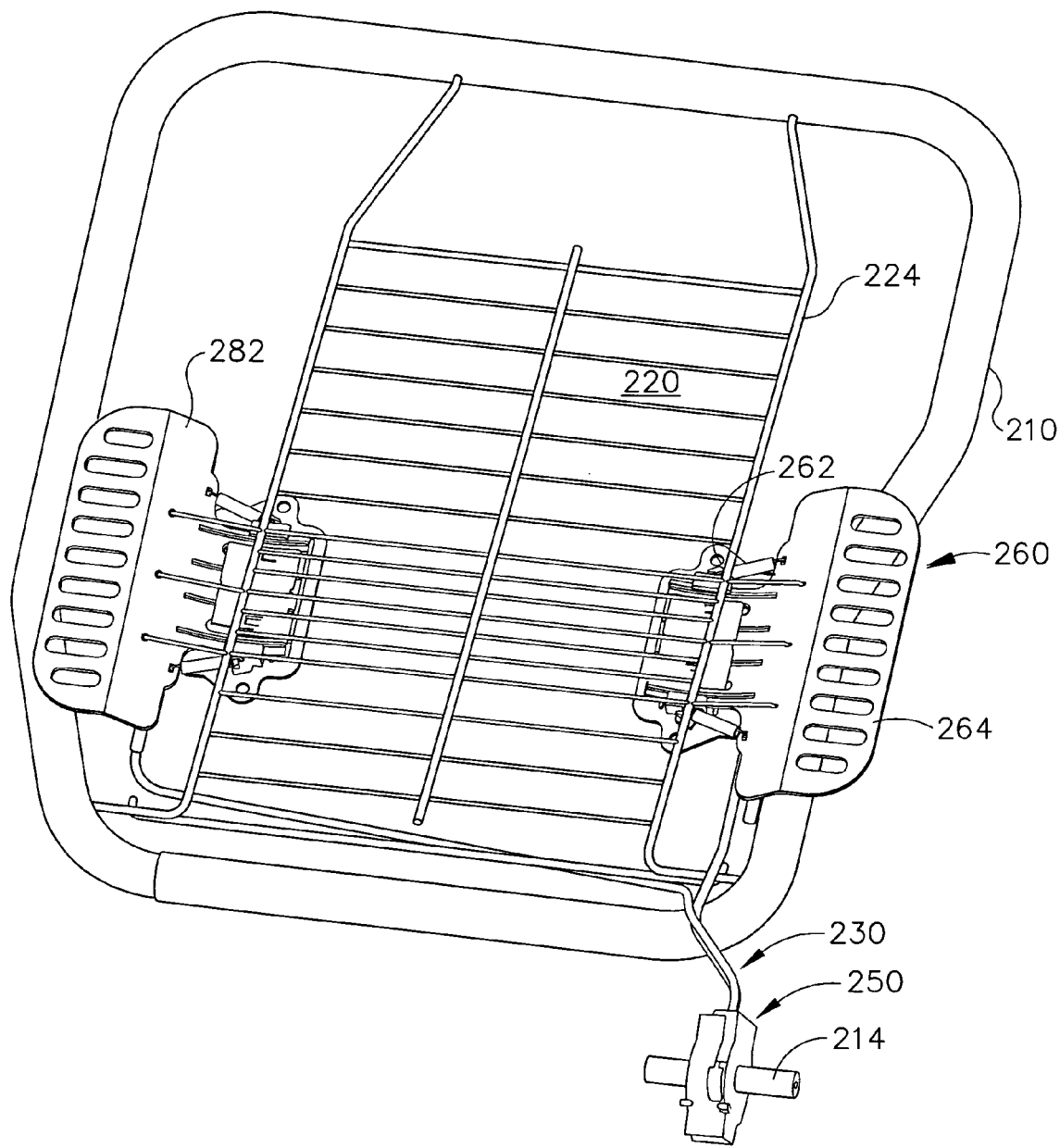
FIG. 8 is a bottom view of another alternative embodiment.
Figure 9:
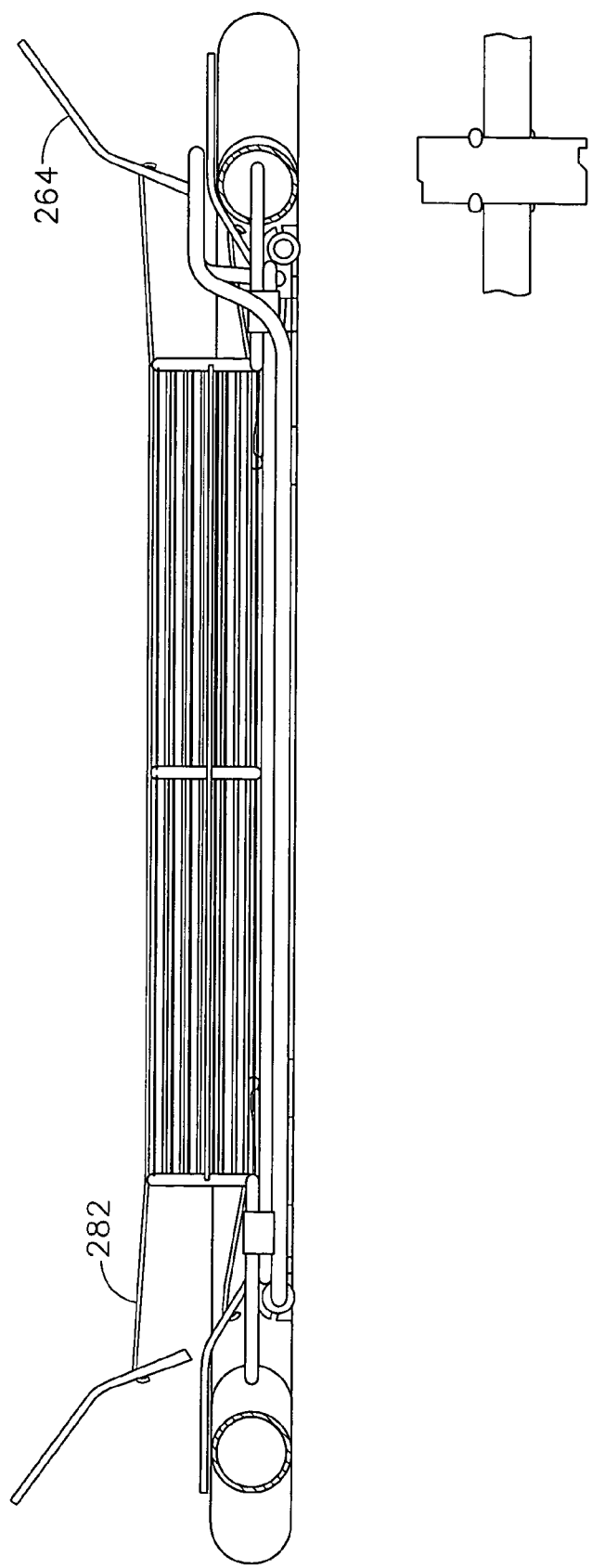
FIG. 9 is a bottom view of another alternative embodiment.

Another alternative embodiment is depicted in FIGS. 8 and 9. In this embodiment lumbar support wire array 220 is either semi-flexible or mounted such that at least a portion of it may move towards a seat occupant.

As before, a seat frame 210 and a torsion bar 214 are cooperatively mounted. An automatic actuator 250 is operatively engaged with torsion bar 214 in order to automatically actuate traction Bowden traction cable 230. The Bowden traction cable actuates two bolsters 260. A fixed portion of the bolster 262 is attached to seat frame 210 and a moving portion of the bolster 264 moves in and out upon actuation to support a seat occupant, in accordance with known bolster movement apparatuses. The Bowden traction cable 230 has a sleeve and a wire, each being respectively engaged with the fixed portion 262 and moving portion 264 of the bolster 260 in order to move the moving portion 264 when traction is applied, again according to known techniques.

The depicted embodiment also includes lateral wires 282, which are attached at either end to each of the two moving portions 264 of bolsters 260. Lateral wires 282 may be attached to the flexible or semi-flexible lumbar support wire array 220, or may be disposed underneath and behind it. In either case, when the moving portions 264 of bolsters 260 move outwards and towards the seat occupant upon actuation, the lateral wires 282 will also move outwards. As lateral wires 282 move outwards, they will carry with them the flexible or semi-flexible wire array lumbar support 220.

In a preferred embodiment, that portion of the wire array 220 that corresponds to the lumbar spine of the seat occupant will be moved. Alternatively, the wire array 220 may be rigid, but movably mounted. ("Outward" means out of the plane of the page and towards the viewer in FIG. 8, and means towards the top of FIG. 9.) In this manner, not only side bolster support but also lumbar support is automatically actuated when frame 210 is folded up into a position for seating.

Figure 10:
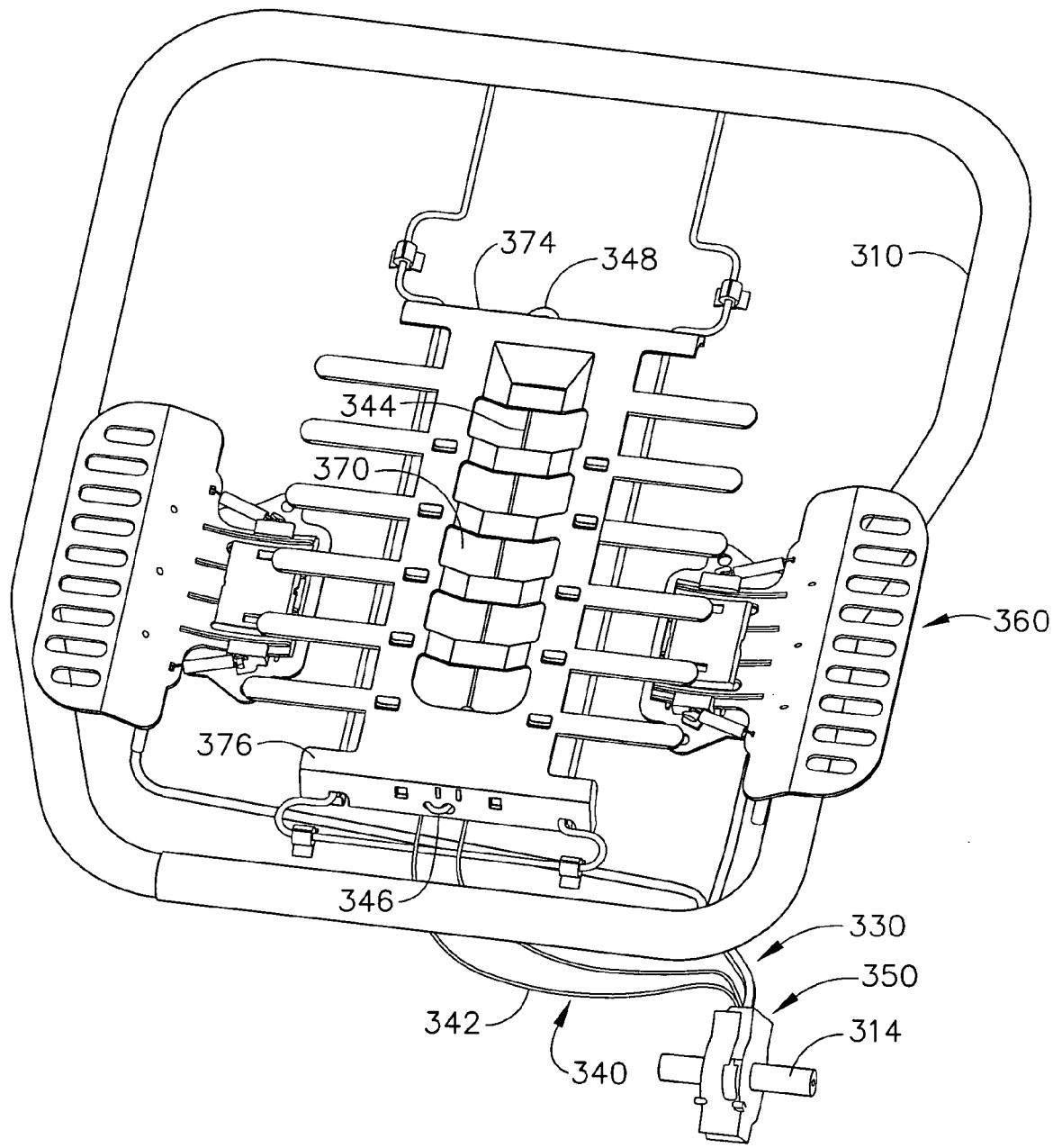
FIG. 10 is a bottom view of another alternative embodiment.
Figure 11:
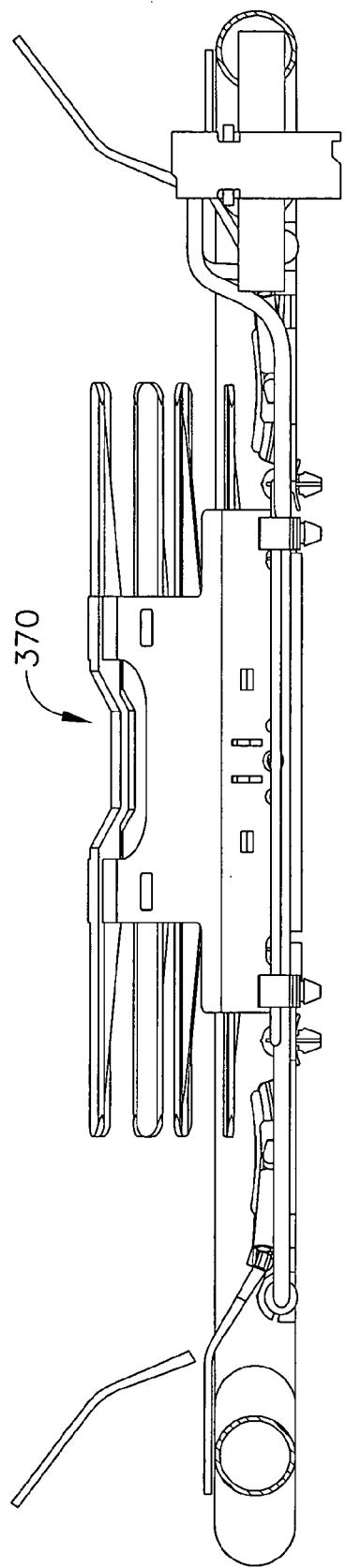
FIG. 11 is a bottom view of another alternative embodiment.

Another embodiment is depicted in FIGS. 10 and 11. This embodiment incorporates an arching pressure surface type of lumbar support sometimes called a "basket," such as those described in U.S. Pat. No. 5,397,164 and U.S. patent application Ser. No. 09/718,263 both of which are incorporated by reference herein. The basket 370 is flexible. It has 2 or 4 sliding mounts 372 that move along rigid guide rods 324, which are mounted to the seat frame 310. A top portion 374 of the arching pressure surface 370 moves towards a bottom portion 376 of the arching pressure surface 370 by sliding along the rigid guide rod 324, which creates a bow or an arch in the arching pressure surface 370 that extends towards the seat occupant and provides lumbar support. In the present embodiment, torsion rod 314, automatic actuator 350 and a first or first pair of Bowden traction cables 330 are mounted and disposed as herein before described. In the embodiment depicted in FIGS. 10 and 11, a second Bowden traction cable 340 is also actuated automatically by actuator 350. Like the other Bowden traction cables, Bowden cable 340 has a sleeve 342 which is mounted at 346 to either the top or bottom portion of the arching pressure surface 370. Bowden traction cable 340 also has a wire 344 which is mounted with wire hook 348 to the other of the top or bottom portions of the arching pressure surface 370. Accordingly, when traction is automatically applied by actuator 350, hook 348 is drawn by wire 344 towards sleeve mount 346, thereby drawings the top 374 and bottom 376 portions of the arching pressure surface 370 towards one another, creating a lumbar supporting arch.

The arching pressure surface may be mounted alone, or in conjunction with bolsters.

Figure 12:
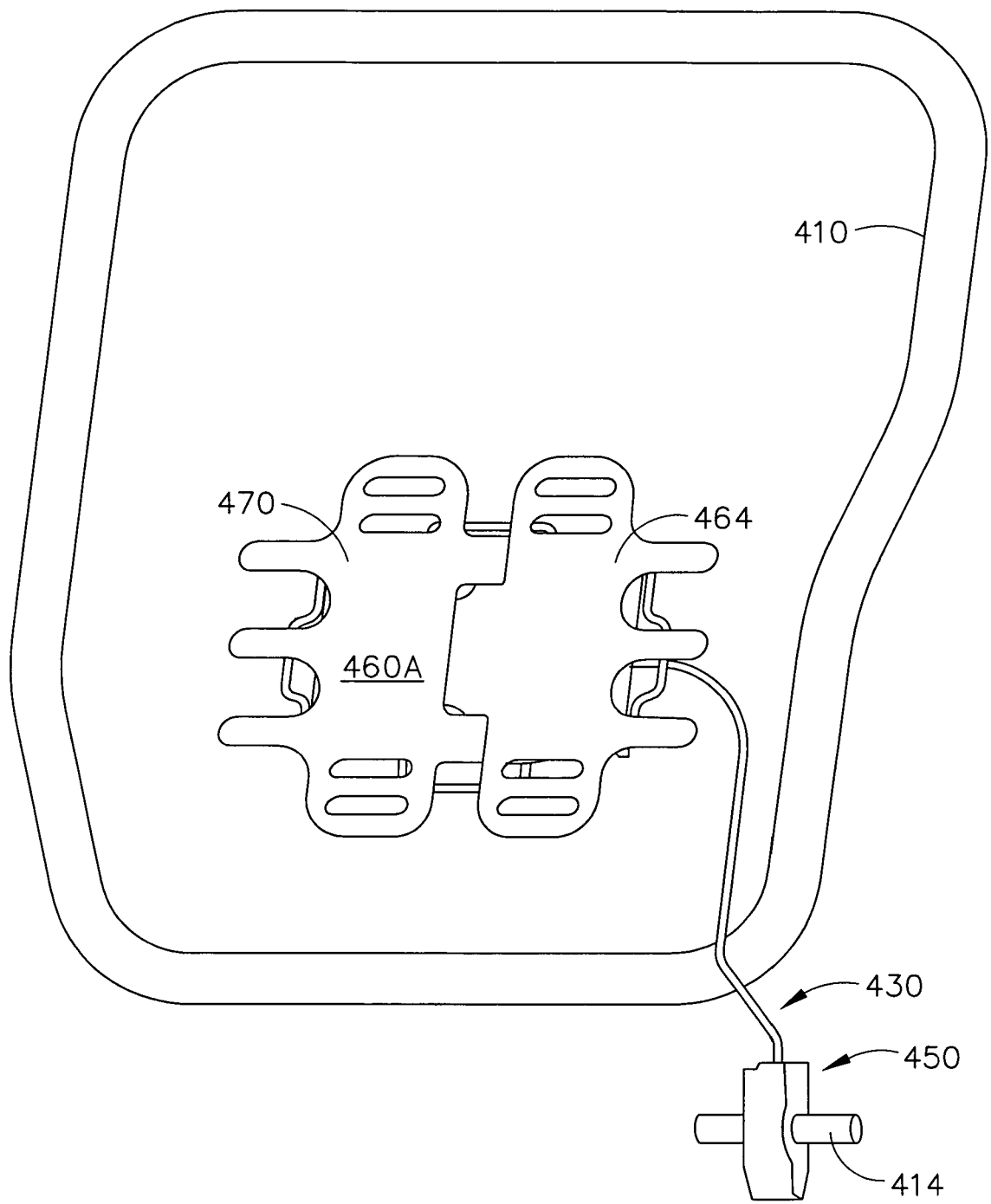
FIG. 12 is a bottom view of another alternative embodiment.
Figure 13:
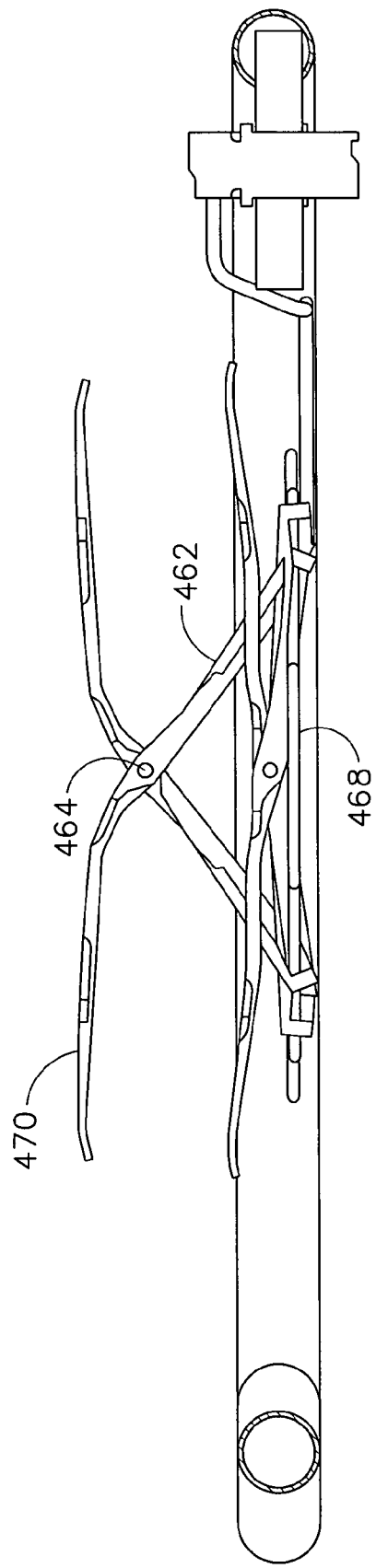
FIG. 13 is a bottom view of another alternative embodiment.
Figure 14:
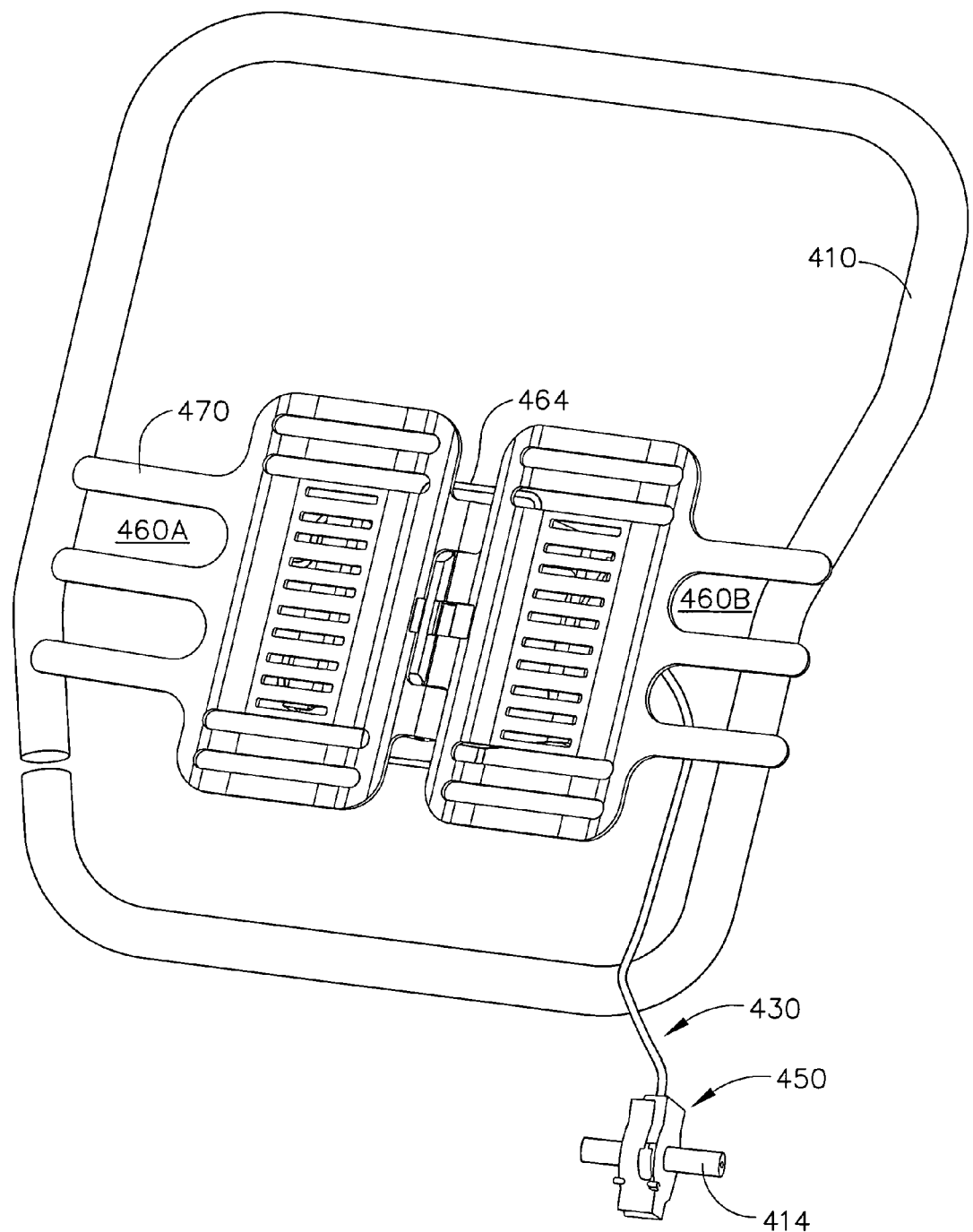
FIG. 14 is a bottom view of another alternative embodiment.
Figure 15:
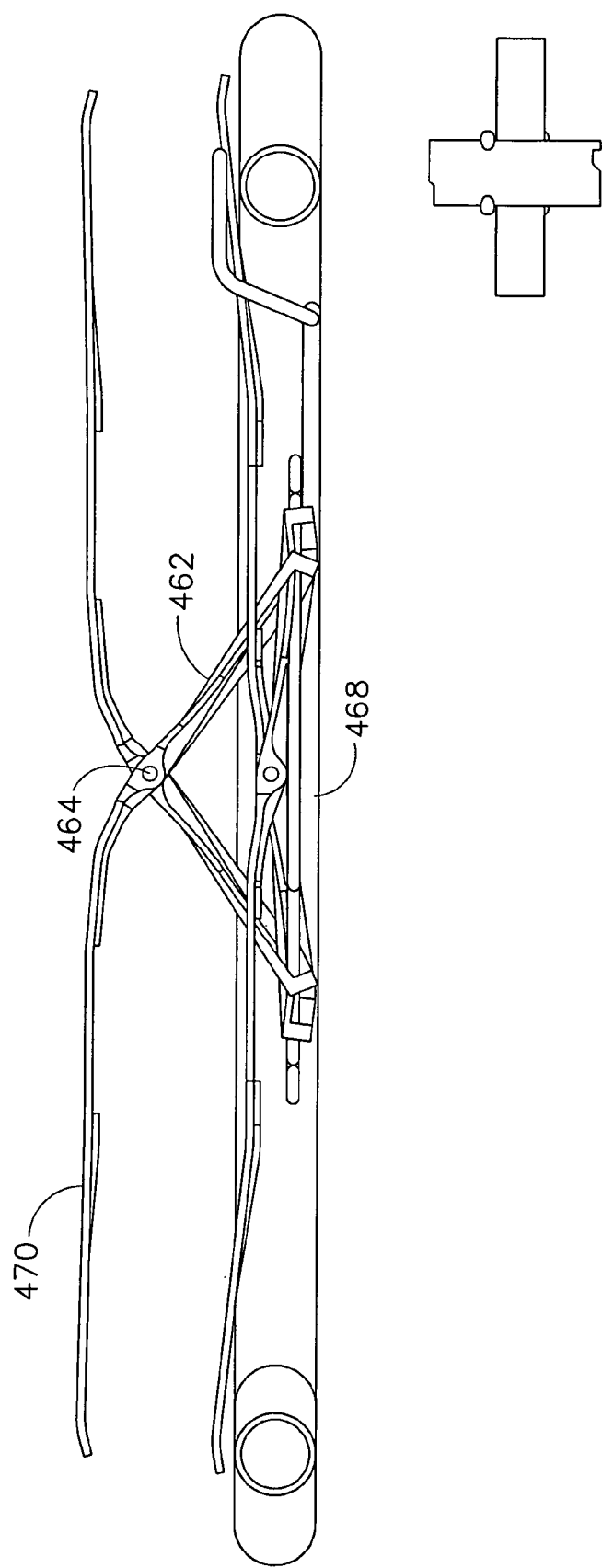
FIG. 15 is a bottom view of another alternative embodiment.

FIGS. 12 and 13 show a first version and FIGS. 14 and 15 show a second version of another embodiment of the present invention. These four figures demonstrate a "scissors" embodiment of the fold down seat automatic actuation system of the present invention. Incorporated by reference is U.S. patent application Ser. No. 10/315,320 which application describes the functioning of scissors lumbar supports upon actuation. Conventional known mounting apparatuses have been omitted from FIGS. 12, 13, 14 and 15 for clarity. As previously, seat frame 410 and torsion rod 414 are interoperatively mounted with the automatic actuator 450 that applies traction to Bowden traction cable 430. The functioning of a scissors lumbar support involves attaching a Bowden cable wire end and a Bowden cable sleeve end to extension lever arms 462.

Scissors lumbar supports are comprised of two wings 460A and 460B that are joined together at a hinge 464. The mounting of scissors lumbar support wings 460 is at the ends of rearward lever arms 462, which slide across the mounts upon traction being applied to them by the Bowden cable sleeve end and Bowden cable wire end. This drawing together of the ends of lever arms 462 causes hinge 464 to ride outwards, which is out of the plane of the page and towards the viewer in FIGS. 12 and 14, and towards the top of FIGS. 13 and 15, and which is towards the seat occupant for lumbar support. Opposite the lever arm extensions 462 on each scissors lumbar support wing 460 is support panel 470. Upon actuation, support panels 470 extend towards the seat occupant with pressure in order to provide lumbar support. They are preferably flexible.

In view of the foregoing, it will be seen that the several advantages of the invention are achieved and attained.

The embodiments were chosen and described in order to best explain the principles of the invention and its practical application to thereby enable others skilled in the art to best utilize the invention in various embodiments and with various modifications as are suited to the particular use contemplated.

As various modifications could be made in the constructions and methods herein described and illustrated without departing from the scope of the invention, it is intended that all matter contained in the foregoing description or shown in the accompanying drawings shall be interpreted as illustrative rather than limiting. Thus, the breadth and scope of the present invention should not be limited by any of the above-described exemplary embodiments, but should be defined only in accordance with the following claims appended hereto and their equivalents.

What is claimed is:

1. In a fold down seat, an automatically actuating ergonomic support system comprising:
    an ergonomic support device adapted to mount on the fold down seat foldable seat frame, said ergonomic support device being selected from the group of supports consisting of a side bolster, a bottom bolster, a wire array lumbar, a pressure surface lumbar, a scissors lumbar, and any combination of said lumbar supports with said bolster supports;
    an actuator operatively engagable with the foldable seat frame of the fold down seat such that at least one of folding and unfolding the fold down seat operates said actuator; and
    a traction cable, said traction cable comprising a wire slidably disposed within a sleeve, engaged with said actuator and with said ergonomic support device such that operating said actuator causes axial sliding of said wire within said sleeve and produces at least one of an extension or a retraction in said ergonomic support.

2. The automatically actuating ergonomic support system of claim 1, wherein said ergonomic support device is at least two bolsters.

3. The automatically actuating ergonomic support system of claim 2, wherein said bolsters pivot upon extension around at least one vertical support member.

4. The automatically actuating ergonomic support system of claim 2, further comprising lateral wires attached to each of said at least two bolsters.

5. The automatically actuating ergonomic support system of claim 4, further comprising a flexible wire array mountable on the foldable seat frame.

6. The automatically actuating ergonomic support system of claim 5, wherein said lateral wires are operatively engaged with said flexible wire array such that upon said extension of said bolsters, a portion of said flexible wire array is extended.

7. The automatically actuating ergonomic support system of claim 6, wherein said portion of said wire array substantially corresponds to the lumbar spine of a seat occupant.

8. The automatically actuating ergonomic support system of claim 6, wherein said flexible wire array is disposed between said lateral wires and a seat occupant.

9. The automatically actuating ergonomic support system of claim 1, wherein said ergonomic support device is an archable pressure surface.

10. The automatically actuating ergonomic support system of claim 1, further comprising an archable pressure surface in addition to said at least one bolster.

11. The automatically actuating ergonomic support system of claim 1, wherein said ergonomic support device is a scissors lumbar support.

12. The automatically actuating ergonomic support system of claim 1, wherein said actuator is comprised of a first section and a second section having relative movement therebetween as the fold down seat is folded and unfolded.

13. The actuating ergonomic support system of claim 12, wherein said ergonomic support device is further comprised of at least one of a sleeve mount and a wire mount, wherein at least one of a first end of said sleeve and a first end of said wire is respectively attached to said sleeve mount and said wire mount, and wherein a second end of said sleeve and a second end of said wire are respectively attached to said first section and said second section of said actuator.

14. The automatically actuating ergonomic support system of claim 13, further comprising a fixed portion of the foldable seat frame and a folding portion of the foldable seat frame, wherein said first end of said wire is attached to said folding portion of the foldable seat frame and said first end of said sleeve is attached to said sleeve mount, wherein said first section of said actuator rotates with said folding portion of the foldable seat and said second section of said actuator remains fixed with respect to said fixed portion of the foldable seat, and wherein said second end of said sleeve and said second end of said wire are respectively attached to said first section and said second section of said actuator.

15. The automatically actuating ergonomic support system of claim 1, further comprising a fixed portion of the foldable seat frame and a folding portion of the foldable seat frame, wherein said actuator is operatively engaged between said fixed portion and said folding portion such that folding said folding portion increases the effective length of said wire.

16. The automatically actuating ergonomic support system of claim 1, further comprising a fixed portion of the foldable seat frame and a folding portion of the foldable seat frame, wherein said actuator is operatively engaged between said fixed portion and said folding portion such that folding said folding portion decreases the effective length of said wire.

17. An ergonomic support system for a seat with a folded position and an unfolded position, comprising:
an ergonomic support device adapted to mount to the seat, said ergonomic support device having a flat position and an extended position, wherein said flat position corresponds with the folded position of the seat and said extended position corresponds with the unfolded position of the seat, and wherein said extended position has a greater depth of space than said flat position;
a means for actuating said ergonomic support device using the relative folding movement of the seat between the folded position and the unfolded position; and
a traction cable, said traction cable comprising a wire slidably disposed within a sleeve, engaged with said actuating means and said ergonomic support device such that operating said actuating means causes axial sliding of said wire within said sleeve and produces at least one of an extension or a retraction in said ergonomic support.

18. The ergonomic support system of claim 17, wherein said ergonomic support device is selected from the group of supports consisting of a bolster, a wire array lumbar, a pressure surface lumbar, a scissors lumbar, and any combination of said lumbar supports with said bolster.

19. The ergonomic support system of claim 17, further comprising a foldable seat frame comprising a fixed portion and a rotating portion, wherein said actuating means is comprised of a fixed mount connected to said fixed portion of said foldable seat frame and a rotating mount connected to said rotating portion of said foldable seat frame.

20. An improved ergonomic support system for a seat wherein the seat comprises a seat frame with a folded position, an unfolded position and a rotation therebetween, said seat frame comprising a fixed portion and a rotating portion, wherein the improvement comprises:
an ergonomic support device mounted on said seat frame, said ergonomic support device comprising a flattened position and an extended position with a greater depth of space than said flattened position, said flattened position and said extended position respectively corresponding with the folded position and the unfolded position of the seat frame; and
a wire operatively engaged with the seat frame and said ergonomic support device, wherein said wire has an effective length, such that the rotation between the unfolded position and the folded position leads to a change in the effective length of said wire, thereby moving said ergonomic support between said flattened position and said extended position.

21. The ergonomic support system of claim 20, wherein said ergonomic support device is selected from the group of supports consisting of a bolster support, a lumbar support, and a combination thereof.

22. The ergonomic support system of claim 21, wherein said lumbar support is selected from the group consisting of a wire may lumbar, a pressure surface lumbar, a strap lumbar and a scissors lumbar.

23. The ergonomic support system of claim 20, further comprising an actuator operatively engaged with the seat frame, wherein said actuator is comprised of a fixed member connected to the fixed portion of the seat frame and a rotating member connected to the rotating portion of the seat frame.

24. The ergonomic support system of claim 20, further comprising a traction cable, said traction cable comprising a sleeve wherein said wire is disposed to slide axially through said sleeve, said traction cable engaged with an actuator and with said ergonomic support device such that operating said actuator causes axial sliding of said wire within said sleeve and moves said ergonomic support between said flattened position and said extended position.

25. The ergonomic support system of claim 20, further comprising an actuator operatively engaged with the seat frame, wherein said actuator is comprised of a fixed member connected to the fixed portion of the seat frame and a rotating member connected to the rotating portion of the seat frame and a traction cable comprising a sleeve wherein said wire is disposed to slide axially through said sleeve, said sleeve having a first sleeve end and a second sleeve end and said wire having a first wire end and a second wire end, wherein said first sleeve end is attached to one of said fixed member and said rotating member, wherein said first wire end is attached to the other of said fixed member and said rotating member, and wherein at least one of said second sleeve end and said second wire end is connected to said ergonomic support device.

26. The ergonomic support system of claim 25, wherein said second sleeve end is connected to at least one of said ergonomic support device and the rotating portion of the seat frame and wherein said second wire end is connected to at least one of said ergonomic support device and the rotating portion of the seat frame.

27. The ergonomic support system of claim 20, further comprising a plurality of actuators engaged with a plurality of ergonomic support devices.

28. The ergonomic support system of claim 27, further comprising a plurality of traction cables engaging a plurality of ergonomic support devices through said plurality of actuators.

29. An improved ergonomic support system for a seat wherein the seat comprises a seat frame with a folded position, an unfolded position and a rotation therebetween, said seat frame comprising a fixed portion and a rotating portion, wherein the improvement comprises:

an ergonomic support device mounted on said seat frame, said ergonomic support device comprising a flattened position and an extended position with a greater depth of space than said flattened position, said flattened position and said extended position respectively corresponding with the folded position and the unfolded position of the seat frame;

a bar operatively engaged with the seat frame;

a wire fixedly engaged with said bar and said ergonomic support device, such that during the rotation between the unfolded position and the folded position of the seat frame, said wire is wound onto and unwound from said bar, changing the effective length of said wire, thereby moving said ergonomic support between said flattened position and said extended position.

30. The improved ergonomic support system for a seat of claim 29, wherein said wire being wound and unwound from said bar causes a change in the tension in said wire.

31. The improved ergonomic support system for a seat of claim 29, wherein said bar further comprises a pulley fixedly attached thereto, wherein said wire is attached to said pulley.

* * * * *